No. 642,611. Patented Feb. 6, 1900.
F. KAISER.
APPLIANCE FOR MOLDING TRUSS HEADS.
(Application filed June 23, 1899.)
(No Model.)
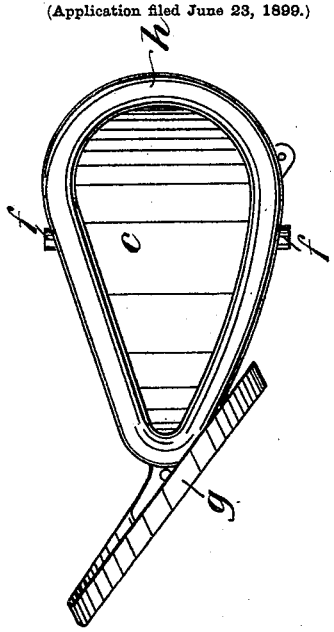
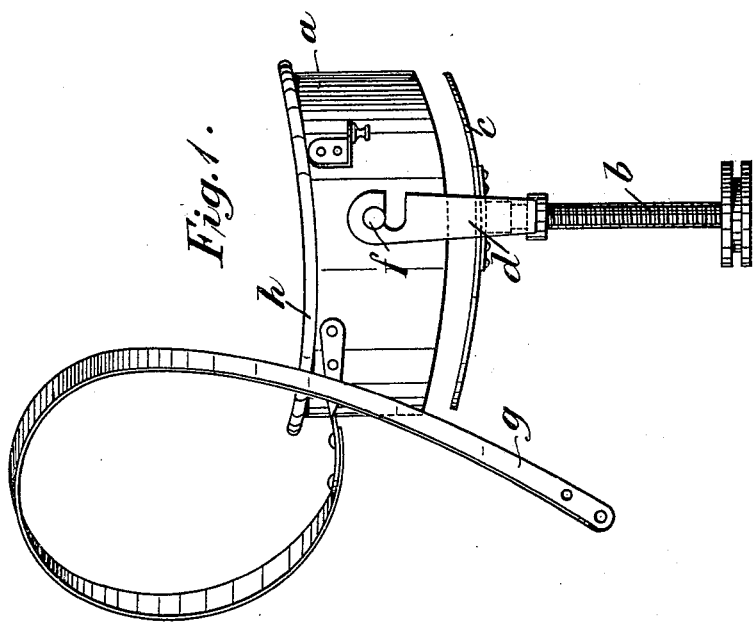
Inventor
Friedrich Kaiser

United States Patent Office.

FRIEDRICH KAISER, OF ST. JOHANN-UPON-SAAR, GERMANY.

APPLIANCE FOR MOLDING TRUSS-HEADS.

SPECIFICATION forming part of Letters Patent No. 642,611, dated February 6, 1900.

Application filed June 23, 1899. Serial No. 721,649. (No model.)

*To all whom it may concern:*

Be it known that I, FRIEDRICH KAISER, a subject of the Emperor of Germany, residing at St. Johann-upon-Saar, Germany, have made certain new and useful Improvements in Appliances for Molding Truss-Heads, of which the following is a specification.

My invention is a molding appliance adapted to be placed upon the body of the person afflicted with hernia and to render it possible to get an exact impression of that part of the body at the hernia, so that a truss-pad may be formed to fit accurately the body at the hernia to keep it in position.

In the drawings, Figure 1 is a side view of the appliance, and Fig. 2 a plan view of the same.

The device comprises a mold $a$ open upon its opposite sides and comprising a shell forming a body wider at one end, as shown in the plan view, than at the other. This shell is adapted to be placed upon the body of the person so as to surround the parts where the hernia exists. For this purpose the contacting edge of the shell is beaded or turned over to provide a comfortable bearing-surface against the body, and this beaded seat is curved to conform approximately to the surface of the body. A presser-plate $c$ moves in the shell, and this is operated by a screw $b$, which is held by a shackle or hook $d$, removably held to the shell by the pin $f$. A spring $g$ serves to hold the mold to the body, and when the mold is adjusted into place it is filled with the plastic material, and then by operating the plate $c$ the material is forced against the body and conforms accurately to the surface thereof. The material sets rapidly, and by using this molded body the head for the truss may be formed in any well-known way. The hollow molds vary in size and shape.

I claim—

1. A molding device consisting of a shell having an edge conforming approximately to the surface of the body and having an open interior and open ends, and a pressing-plate with means for moving said plate in the shell, substantially as described.

2. A molding device comprising the shell having an edge to bear on the body, a pressing-plate movable in said shell, a screw for operating the plate and a hook $d$ detachably secured to the shell, substantially as described.

In witness whereof I have hereunto set my hand in presence of two witnesses.

FRIEDRICH KAISER.

Witnesses:
M. FORSCHNER,
FRITZ GRÖLLS.